Patented Aug. 2, 1949

2,478,162

UNITED STATES PATENT OFFICE 2,478,162

ASPHALT COMPOSITIONS

Harry J. Sommer, Lafayette, Calif., assignor to Shell Development Company, San Francisco, Calif., a corporation of Delaware No Drawing. Application March 31, 1947, Serial No. 738,493

5 Claims. (Cl. 106—273)

This invention deals with the manufacture of asphaltic materials and of products or compositions containing the same. It is more particularly concerned with the coating of surfaces with asphalts and with the adhesion of asphalt coating in the presence of moisture. This invention is especially useful in the production of bituminous compositions, pavements, roads, floors, paints, rust preventives, and the like.

It is well known that asphalts have relatively good covering and adhesive properties to dry solids, such as rocks, stones, sand, cement, iron, glass, etc. However, when the solid is moist or wet, it often becomes difficult or even impossible to obtain a satisfactory bond between the such wetted aggregate and the asphalt. Furthermore, when a solid, however coated, is exposed to water, it often happens that water displaces more or less rapidly the asphalt from the solid and may strip it completely.

These facts are of great importance, particularly in the building of roads with unemulsified asphalts, as it is in general necessary to employ dry aggregate for their construction, thus involving or necessitating costly drying or waiting for propitious weather. Furthermore, roads once constructed may disintegrate under the influence of rain or telluric moisture when the bond between the asphalt and the aggregate fails. Thus, in the past a great deal of effort was directed toward providing methods for successfully coating wet aggregate with asphalt and producing water resistant coverings.

Asphaltic emulsions may be used on wet aggregate, but they cannot be applied during inclement weather if good coating and cementing action is to be obtained.

Addition of paraffin, montan wax and similar materials is sometimes recommended to prevent the stripping of asphalt from aggregate, but in many cases these materials are not very effective. They seem to impart a certain rigidity to the surface of the asphalt so that in the presence of water it does not recede easily, although water often penetrates between the asphalt and the aggregate. When, however, the aggregate is subjected to a strain, vibration or higher temperature, the rigidity is insufficient to prevent its stripping.

Rigidity of the asphalt is a more effective factor in decreasing the stripping tendency of asphalts of low penetration which often seem to adhere to aggregates more tenaciously than more fluid asphalts and especially cutbacks. However, such asphalts require heating during application, which often makes their use too cumbersome.

Addition of surface anion active agents such as organic lypophilic acids markedly improves the adhesion of asphalts to basic rocks such as limestone, but has little or no effect upon their adhesion to acidic rocks such as granite. Treatment of the latter rocks with hydroxides or salts of polyvalent metals such as calcium, prior to coating with an asphalt containing such acids, yields quite good results but greatly complicates the procedure. These methods really do improve the wetting properties of asphalt toward at least some types of aggregate, so that stress, vibration or higher temperature do not greatly increase the stripping of the asphalt. Thus in actual road practice they may show greatly improved water resistance. Furthermore, they may allow the successful coating of wet aggregate.

Surface cation active agents have also been proposed to improve adhesion of asphalts to aggregates. Unfortunately, however, many agents of this type are relatively ineffective; some because they simply are inactive; others because they are too unstable to provide a lasting effect; still others because they are too insoluble in asphalt, etc. Thus, for example, $C_{16}$ or $C_{18}$ aliphatic primary amines are crystalline, wax-like and of limited solubility in asphalts. They seem to improve the adhesion of asphalt to acidic rocks, but this appears to be largely due to a rigidity effect and does not provide full protection in actual road practice. Aryl amines, on the other hand, such as naphthylamines or aniline, as well as azocyclic compounds such as pyridine or nitrogen bases naturally present in many asphalts, are quite soluble in asphalt but do not seem to improve noticeably the stripping tendency of asphalts.

It is an object of this invention to improve the adhesion of bituminous materials, particularly of asphalts, to solids, to make possible the successful coating of moist or wet solids with bitumens, and to decrease the stripping of asphalt coated solids in the presence of moisture. More particularly, it is an object of this invention to improve the duration of adhesion of bituminous materials to aggregate, as well as to improve the initial adhesion thereto. Still further objects include the production of an all-purpose asphalt capable of improved adhesion to acidic rocks in particular, of improved road building and soil stabilizing materials, of paints, rust preventives, etc. Still further objects will become evident in the following discussion.

Now in accordance with this invention, bituminous substances and solids are brought together in the presence of relatively minor amounts each of sulfur and of an oleophilic aliphatic monoamine.

The term "bituminous substances" as used in describing this invention is meant to include substances containing asphaltenes or tarry constituents such as the following:

Bitumens:
    Natural waxes—
        Ozokerite
        Ceresine
        Montan wax
    Natural asphalt—
        Malta asphalt
        Trinidad asphalt
    Asphaltites—
        Gilsonite
        Glance pitch
        Grahamite
Pyrogenous distillates:
    Pyrogenous waxes—
        Paraffin wax
    Petroleum tars—
        Oil-gas tar
    Coal tar—
        Gas-retort coal tar
        Low-temperature coal tar
    Wood tars—
        Pine tar
        Hardwood tar
    Miscellaneous tars—
        Peat tar
        Lignite tar
        Shale tar
        Bone tar
Pyrogenous residues:
    Pyrogenous asphalts—
        Residual oils
        Blow petroleum asphalt
        Soft residual asphalt
        Hard residual asphalt
        Sludge asphalt
    Petroleum pitch—
        Oil-gas tar pitch
    Coal-tar pitch—
        Gasworks coal-tar pitch The combinations of sulfur with the amines described below are also useful in improving the adhesion to solids of lubricating oils, electrical oils, spray oils, etc.

The solids toward which the subject combination of modifiers is most active comprise the so-called "acidic" aggregates, such as granite, quartz, feldspar, and many other substantially inert substances such as igneous rocks, silica sands, diatomaceous earths, clays, mica, asbestos, etc; other solids which may be benefited include glass, Portland cement, iron, other metals, and synthetic resins such as phenolic resins, glyptal resins, etc.

The sulfur, which enhances the adhesion characteristics of the amines listed below so remarkably, must be added in a free state, that is, not as a sulfur compound. Any of the various physical forms of sulfur are satisfactory, including flowers of sulfur, colloidal sulfur, lac sulfur, washed sulfur, etc.

It has been found that the addition of sulfur to all types of amines does not produce the same results in each case. For example, if sulfur and diamines are present together in bituminous compositions a considerable evolution of hydrogen sulfide occurs. Moreover, if sulfur is added to bituminous compositions containing halogenated amines, such as quaternary ammonium salts or the ammonolysis product of chlorinated paraffin, the adhesion characteristics are substantially poorer than if sulfur is absent. However, if the sulfur is combined in bituminous compositions with oleophilic aliphatic monoamines there is an unexpected increase in the degree and permanence of the adhesion of such compositions to various aggregates and other solids.

The preferred oleophilic aliphatic monoamines for use in combination with sulfur are those having from about twelve to about twenty-four carbon atoms, and especially those having 12–18 carbon atoms, wherein the amino group is attached to a terminal carbon atom. This preferred group includes: 1-amino-dodecane, 1-amino-tridecane, 1-amino-tetradecane, 1-amino-pentadecane, 1-amino-hexadecane, 1-amino-heptadecane and 1-amino-octadecane.

Another suitable group of aliphatic monoamines are those in which the amino group is attached to a carbon atom at a position other than at the terminal. Such amines include 3-amino-dodecane, 4-amino-hexadecane, 6-amino-octadecane, etc.

A third group of suitable monoamines are those in which the carbon chain to which the amino group is attached is a branched chain. Such amines include 2,2-dimethyl-4-amino-decane, 2-methyl-3-ethyl-6-amino-dodecane, 2,3-di-isopropyl-8-amino-decane, and 1,3,5,7,-tetramethyl-10-amino-decane.

The sulfur and amines may be applied by incorporating them in the bitumen, either directly by thorough stirring or by first dissolving them in a solvent such as gasoline, kerosene or lubricating oil and commingling the solution with the bitumen. Moderate heating may be helpful. One or both of the modifiers may also be applied to the aggregate prior to the application of the asphalt, e. g. in the form of a solution in an organic solvent or as an aqueous emulsion, or by other suitable means. The sulfur, alternatively, may be dissolved in the amine. When producing asphalt concrete, it is often convenient to admix the sulfur and amine during the mixing of the asphalt and the aggregate. The amine may be used either in the form of a free amine, or of the salt of an acid, or a mixture of both.

As the necessary quantities of sulfur and amines are small relative to that of the asphalt and especially of the aggregate, it is in general advantageous to disperse them in suitable diluent carrier as described above in order to insure thorough dispersion.

The presence of free strong alkali tends to reduce the activity of the sulfur and amines. Naphthenic or other soaps free from free alkali are not usually harmful at ordinary temperatures, but if heat is applied to such a mixture for extended periods, such soaps often decrease or destroy the beneficial properties of the combination of sulfur and amine, probably through liberation of alkalies by hydrolysis or complex formation. Thus adhesion of soda-asphalts, which may contain 10% or more of sodium naphthenate, as well as free NaOH, cannot be substantially improved by the addition of sulfur and amines.

If asphalts which contain neutral soaps and amines are shipped in heated tank-cars, the activity of the amine may decrease somewhat. It should be noted, however, that addition of sulfur to such compositions minimizes such adverse shipping changes.

Adhesion of asphalts to various types of solid surfaces may be improved still further if, in addition to the sulfur and amines, an organic lypophilic acid, particularly a higher fatty acid, is present. The combination improves the adhesion of asphalt toward acidic, neutral and basic surfaces. Suitable lypophilic acids include naphthenic acids, fatty acids such as stearic acid, wool fat acids, paraffin acids, higher alkyl diacids such as dialkyl succinic acids, phthalic acid, oil-soluble sulfonic acids, etc.

The amount of sulfur and of amine necessary to enable successful application of asphalt to a wet surface and to insure production of a water resistant composition of high compressive strength varies with extent and nature of the surface to be covered, the nature of the asphalt, the method of application, and the degree permanence of improvement desired. Thus, for example, if a coarse aggregate, e. g. one that is retained by a 30 mesh screen, is to be covered, about 0.1% each of sulfur and amine may be required, while when a dusty aggregate containing substantial amounts of 200 mesh and finer components is to be cemented, as much as about 2% of each additive may be necessary. When dissolved in an asphalt cutback, slightly larger amounts of sulfur and amines may be necessary than if they are applied to the solid in a volatile solvent prior to the application of the asphalt.

In order to evaluate stripping tendency, the following test procedure, known as the "total water immersion test" or T. W. I. T. was developed:

The asphalt to be tested for storage stability is heated for 7 days at 121° C. 500 gms. of an aggregate passing 1.5 inch screen but retained by .75 inch screen is immersed in water for 30 minutes, drained 30 secs. and mixed for five minutes with 35 gms. of asphalt cutback heated to 70–120° C. in a large porcelain dish by means of a large aluminum spoon.

The coated rock is placed in a wide mouth, screw top, pint jar and the lid tightened. After allowing it to stand for 30 minutes, the contents of the jar are covered with distilled water, the lid replaced and the jar placed in a thermostat bath at 104° F. for 3 hours.

At the end of this time the stones while under water are individually inspected, and the surface which has remained covered is evaluated visually and averaged for all stones. The result is expressed in tenths of the surface, rounded to the nearest integer and is reported as the T. W. I. T. value. Accordingly, if the stones remain on the average 95% or more covered with the asphalt at the end of the test, the T. W. I. T. value is 10; if they remain 45–55% covered, the value is 5.

A granitic aggregate was used in the T. W. I. T. series in which samples of a California asphalt cutback containing various addition agents were used. Results are shown in the table below:

| Per Cent Sulfur | Per Cent 1-Amino-octadecane | T. W. I. T. Value |
|---|---|---|
| 0.0 | 0.0 | 0 |
| 0.0 | 0.8 | 1 |
| 0.1 | 0.8 | 9 |
| 0.3 | 0.8 | 9 |
| 0.5 | 0.8 | 9 |
| 0.8 | 0.8 | 9 |
| 1.0 | 0.8 | 8 |
| 2.0 | 0.8 | 8 |

I claim as my invention:

1. A bituminous composition comprising as the binder therefor a major amount of an asphalt and 0.1–2.0% each, by weight of the asphalt, of sulfur and an oleophilic aliphatic mono-amine having 12 to 24 carbon atoms.

2. A bituminous composition consisting essentially of an asphalt and 0.1–2.0% each, by weight of said material, of sulfur and an oleophilic aliphatic mono-amine having 12–24 carbon atoms.

3. A bituminous composition consisting essentially of an asphalt and 0.1–2.0% each, by weight of the asphalt, of sulfur and 1-amino-octadecane.

4. A bituminous composition consisting essentially of an asphalt and 0.1–2.0% each, by weight of the asphalt, of sulfur and 4-amino-hexadecane.

5. A bituminous composition consisting essentially of an asphalt and 0.1–2.0% each, by weight of the asphalt, of sulfur and 1-amino-heptadecane.

HARRY J. SOMMER.

REFERENCES CITED

The following references are of record in the file of this patent:

UNITED STATES PATENTS

| Number | Name | Date |
|---|---|---|
| 2,169,814 | Patrick | Aug. 15, 1939 |
| 2,375,653 | Holmes | May 8, 1945 |

FOREIGN PATENTS

| Number | Country | Date |
|---|---|---|
| 847,829 | France | July 10, 1939 |
| 560,716 | Great Britain | Apr. 18, 1944 |